Feb. 21, 1961 R. L. FORD ET AL 2,972,357
HYDRAULIC ROTARY SELECTOR VALVE
Filed June 3, 1957 7 Sheets-Sheet 1
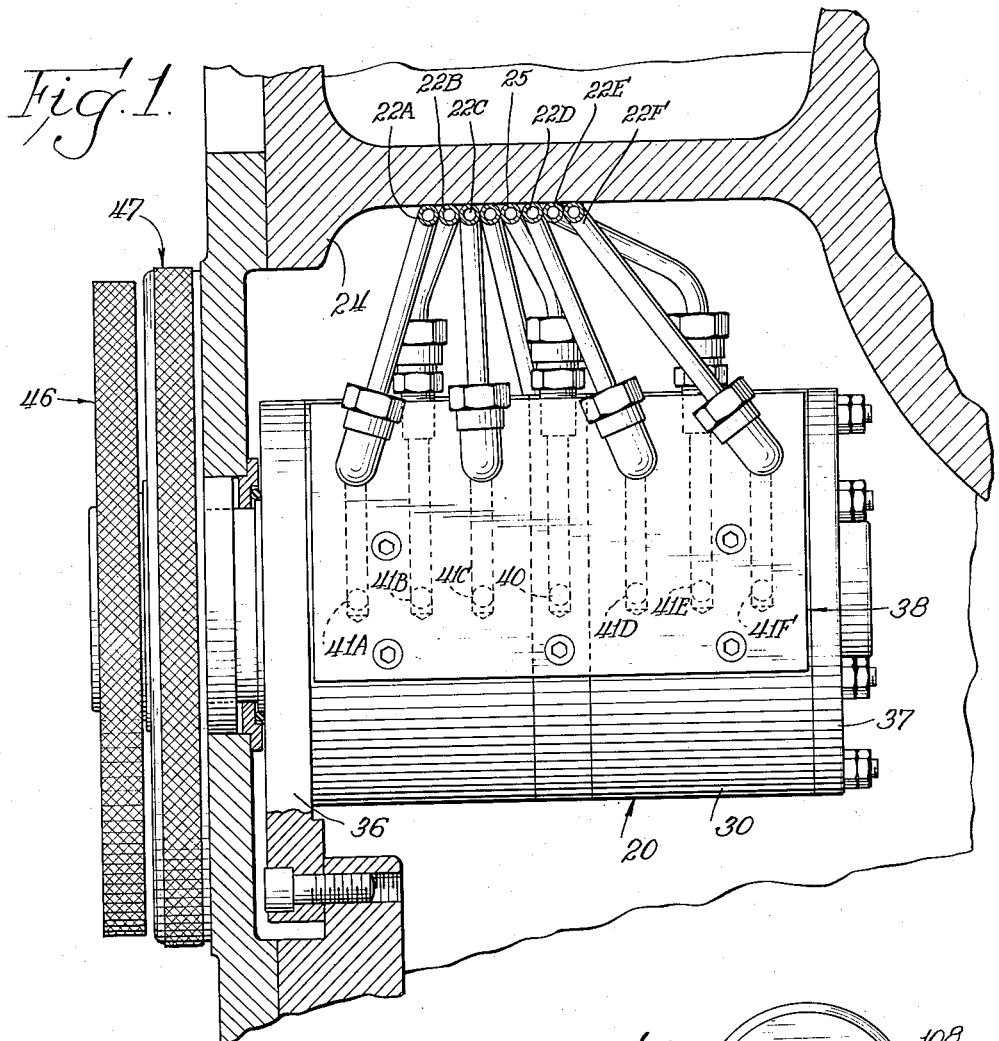
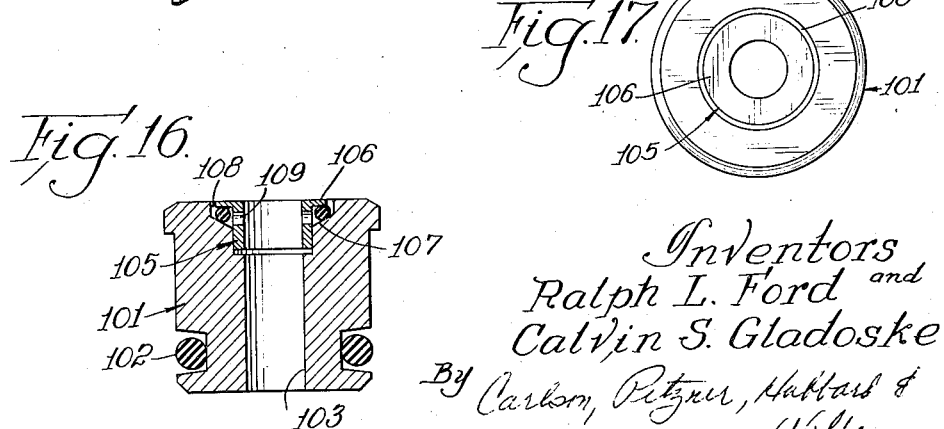
Inventors
Ralph L. Ford and
Calvin S. Gladoske
By Carlson, Pitzner, Hubbard &
Wolfe
Attys.

Feb. 21, 1961 R. L. FORD ET AL 2,972,357
HYDRAULIC ROTARY SELECTOR VALVE
Filed June 3, 1957 7 Sheets-Sheet 2
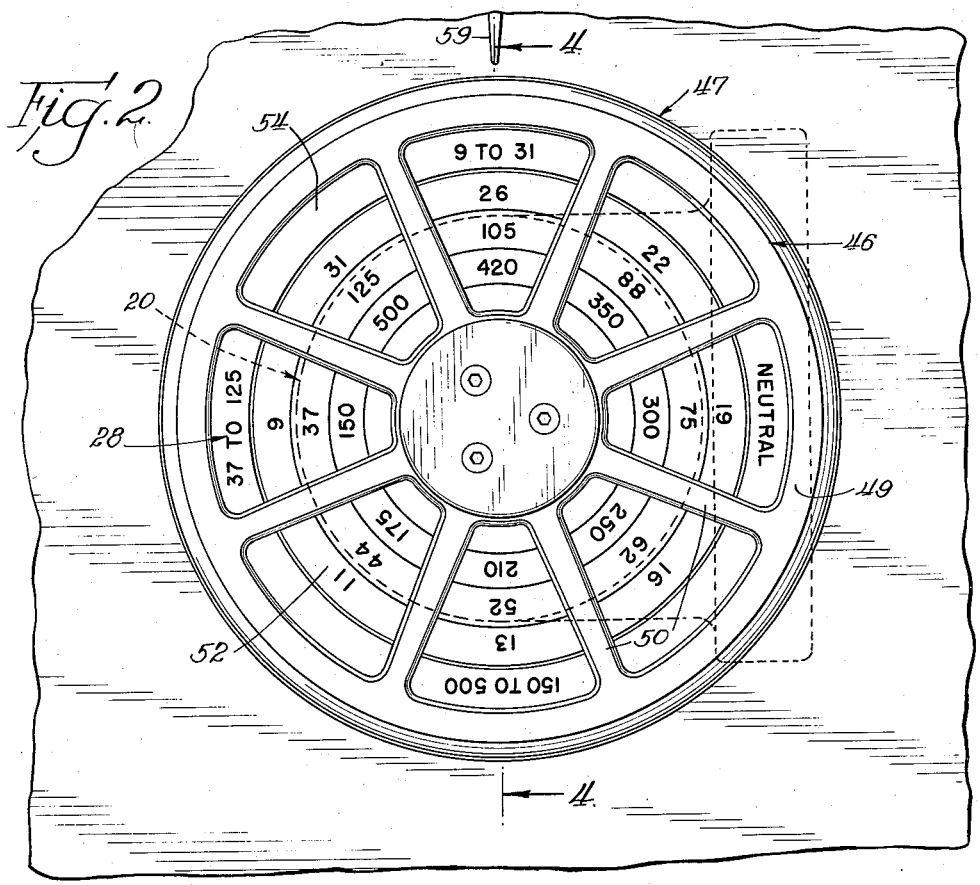
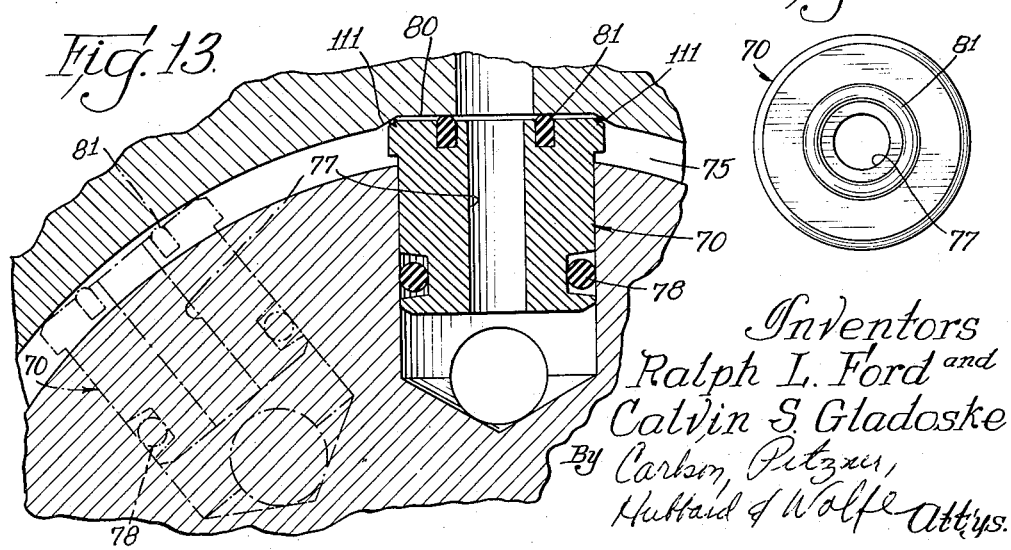
Inventors
Ralph L. Ford and
Calvin S. Gladoske
By Carlson, Pitzner,
Hubbard & Wolfe Attys.

Feb. 21, 1961 R. L. FORD ET AL 2,972,357
HYDRAULIC ROTARY SELECTOR VALVE
Filed June 3, 1957 7 Sheets-Sheet 3
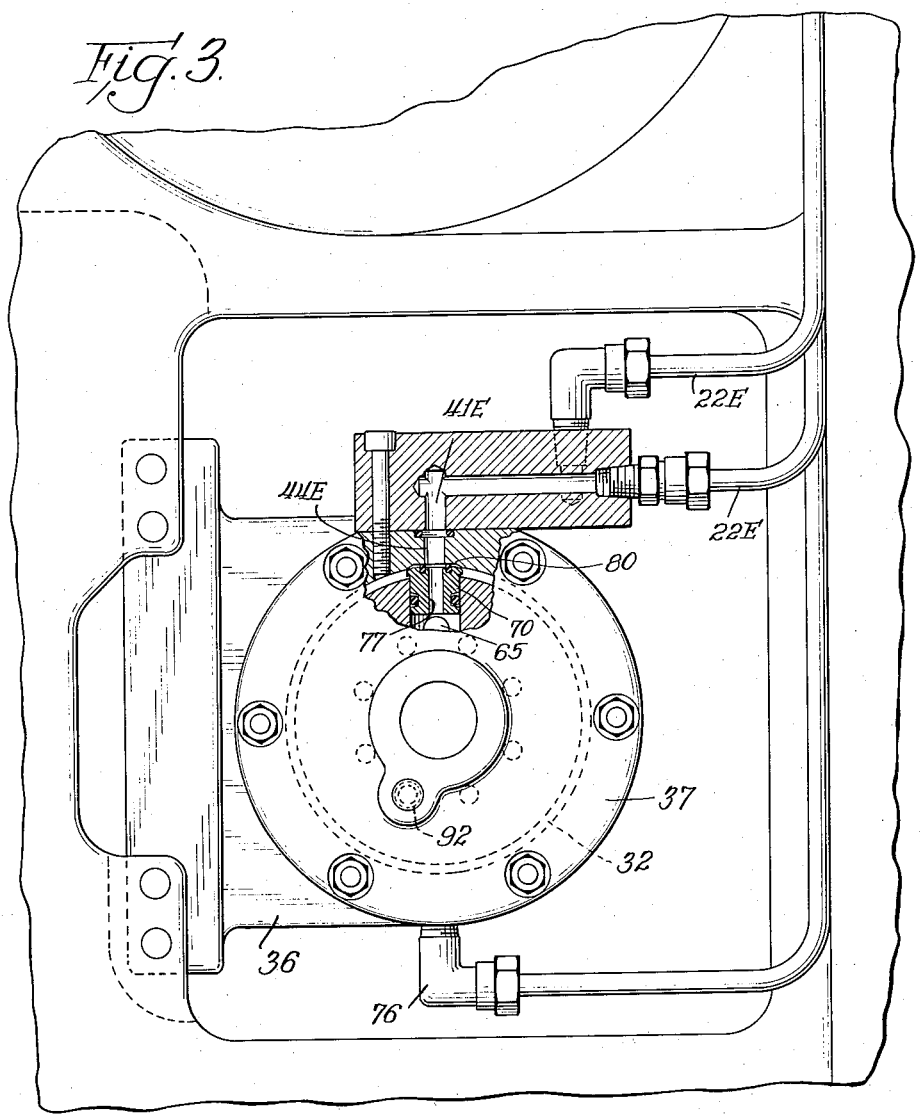
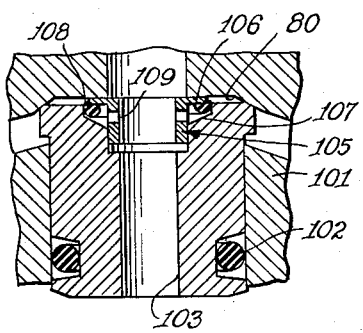
Inventors
Ralph L. Ford and
Calvin S. Gladoske Feb. 21, 1961 R. L. FORD ET AL 2,972,357
HYDRAULIC ROTARY SELECTOR VALVE
Filed June 3, 1957 7 Sheets-Sheet 4

Inventors
Ralph L. Ford and
Calvin S Gladoske
By Carlson, Pitzner,
Hubbard & Wolfe
Att'ys.

Feb. 21, 1961 R. L. FORD ET AL 2,972,357
HYDRAULIC ROTARY SELECTOR VALVE
Filed June 3, 1957 7 Sheets-Sheet 5

Inventors
Ralph L. Ford and
Calvin S. Gladoske
By Carlson, Pitzner, Hubbard & Wolfe
Attys.

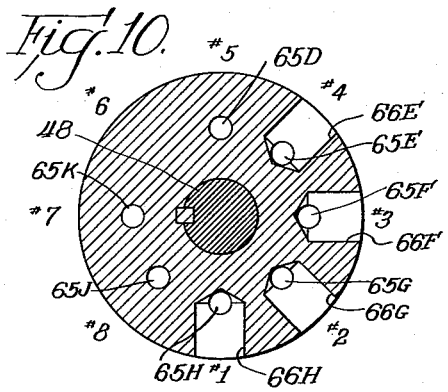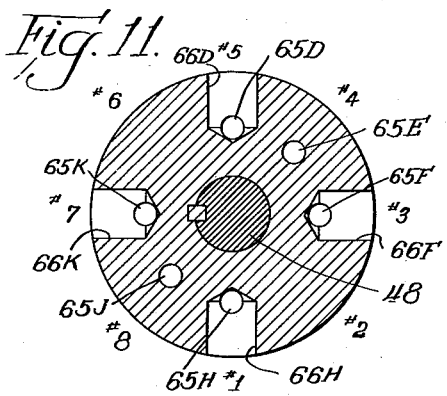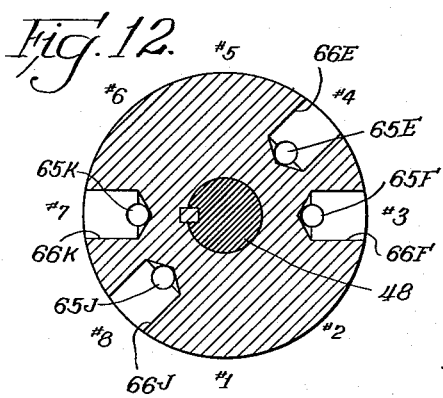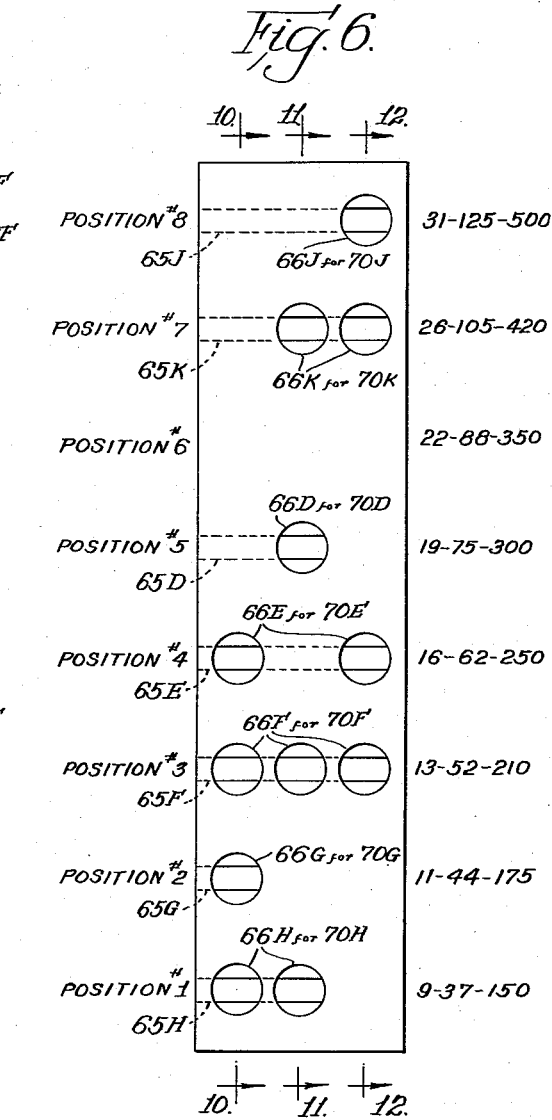

United States Patent Office 2,972,357
Patented Feb. 21, 1961

2,972,357

HYDRAULIC ROTARY SELECTOR VALVE

Ralph L. Ford and Calvin S. Gladoske, Fond du Lac, Wis., assignors to Giddings & Lewis Machine Tool Company, Fond du Lac, Wis., a corporation of Wisconsin Filed June 3, 1957, Ser. No. 663,096

11 Claims. (Cl. 137—625.11)

This invention relates to a hydraulic control valve and more particularly, a hydraulic rotary selector valve.

It is a general object of the invention to provide an improved means for preventing leakage in a hydraulic control valve.

A more specific object of the invention is to provide in a valve for controlling hydraulic fluid under relatively high pressures having movable valve elements which are adjustable to a plurality of operating positions, novel means utilizing the pressure of the hydraulic fluid passing through the valve when the valve is in operation to effect a fluid seal between the elements.

Another more specific object is to provide novel sealing means for a rotary seletcor valve having a spool and housing, employing seal plungers which are slidably mounted in the passages of the spool, and when subjected to the pressure of hydraulic fluid passing through the valve effect a fluid-tight seal with the housing wall defining the spool chamber.

Still a further object lies in the provision of a precision type rotary selector valve of the aforesaid character which is efficient in operation, may be economically manufactured due to its relatively simple construction, and yet provides a leakage proof construction for fluid under relatively high pressures.

Other objects will appear from the following description taken in connection with the accompanying drawings, wherein:

Figure 1 is a fragmentary horizontal sectional view of a planar-miller headstock provided with a rotary selector valve embodying the features of the present invention, the valve being shown in side elevation;

Fig. 2 is a front view in elevation of the valve and is taken substantially in the plane of lines 2—2 of Figure 1;

Fig. 3 is a rear view in elevation of the valve taken substantially in the plane of lines 3—3 of Figure 1;

Figs. 5 and 6 are developed views of the circumferences of the valve spools;

Figs. 10–12 are transverse sectional views taken through the rear spool substantially in the planes of lines 10—10, 11—11 and 12—12, respectively, and show the locations of the longitudinal passages and the radial passages;

Fig. 13 is an enlarged fragmentary sectional view showing a preferred form for the seal plungers for the valve spools and is taken substantially in the plane of lines 13—13 of Fig. 4;

Fig. 14 is an enlarged plan view of the plungers shown in Fig. 13;

Fig. 16 is an enlarged transverse sectional view showing an alternative form of seal plungers for the valve spools;

Fig. 16a is an enlarged fragmentary sectional view showing details of the form of seal plunger shown in Fig. 16;

Fig. 17 is a plan view of the plunger shown in Fig. 16; and

Figure 4:
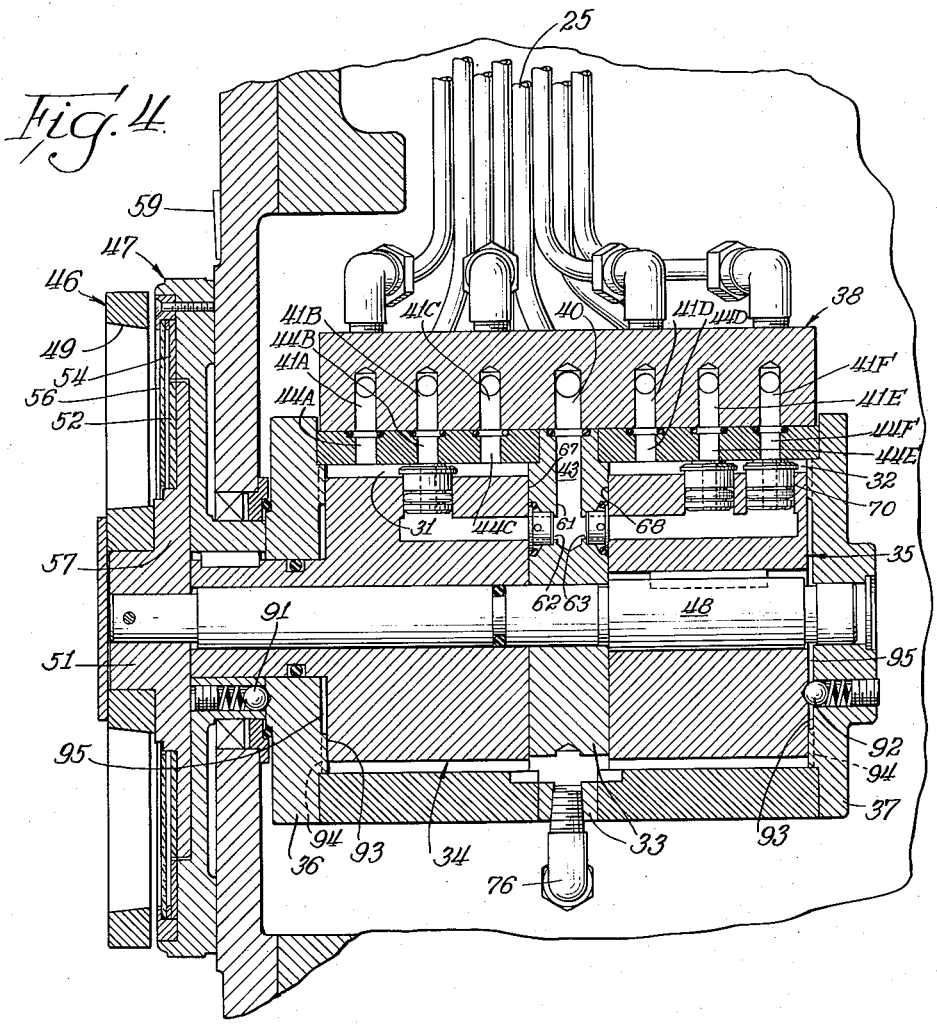
Fig. 4 is a longitudinal vertical sectional view taken along lines 4—4 of Fig. 2.

While the invention is susceptible of various modifications and alternative constructions, preferred embodiments thereof have been shown in the drawings and will be described below in detail. It should be understood, however, that there is no intention to limit the invention to the specific forms disclosed, but, on the contrary, the invention is to cover all modifications, alternative constructions and equivalents falling within the spirit and scope of the invention as expressed in the appended claims.

Turning now to the drawings, the invention is shown embodied for illustrative purposes in a rotary selector valve 20 (Figs. 1–4) for selectively controlling delivery of fluid under pressure through a plurality of outlet pressure lines 22A–F of a hydraulic control circuit to a plurality of gear shifting cylinders 23A–D (Fig. 18) for obtaining different speeds in the transmission of the headstock 24 (Fig. 1) of a machine tool such as a planer-miller. In many hydraulic control circuit applications employing selector valves of this type, fluid leakage in the selector valve is allowed and compensated for. Where hydraulic fluid is under relatively low pressure and adequate capacity is available, fluid leakage presents no real problem. In this machine tool, however, there is a single source of fluid for operating other elements as well as for gear shifting. The system, in addition, uses fluid under a relatively high pressure, i.e. 675 p.s.i. This control system, however, is completely separate from the lubrication system for the machine tool and leakage between the systems must be prevented to avoid contamination. A major problem has been experienced heretofore in preventing leakage of the high pressure fluid of the control system, in the selector valve.

Figure 18:
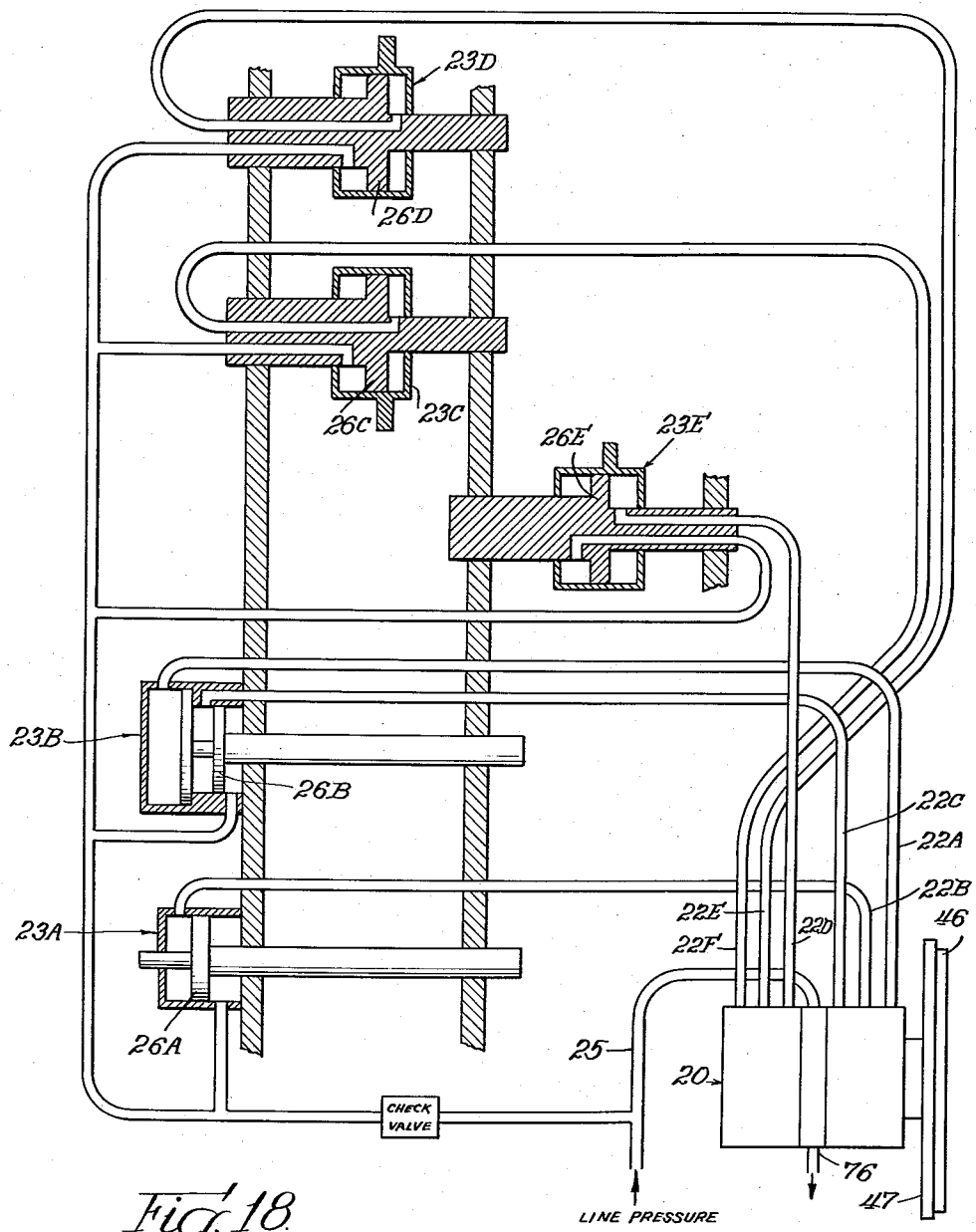
Fig. 18 is a schematic view showing a hydraulic circuit embodying the rotary selector valve.

As shown in Fig. 18, high pressure fluid is supplied from a pressure line 25 and is delivered selectively through the outlet lines 22A–F to the gear shifting cylinders. Insofar as practical, the circuit and control instrumentalities have been shown schematically in Fig. 18. It will be readily evident that the gear shifting cylinders 23A–D contain differential pistons 26A–D, having on opposite sides fluid pressure derived directly from the line 25, and line pressure derived through one or more of the outlet lines 22A–F connected to the rotary selector valve 20. The function of the rotary selector valve 20 is to enable selective actuation of the gear shifting cylinders 23A–D so as to obtain a desired transmission speed merely by rotating the rotary valve to a predetermined position as given by a dial or indicator 28 on the face of the valve.

Referring to Figure 1, the rotary selector valve is shown mounted to the headstock 24 of a machine tool by bolts or the like. In general, the valve is comprised of a stationary elongated housing 30 defining forward and rear spool chambers 31, 32 divided by a center plate 33. Rotatable spools 34, 35 are received within the spool chambers 31, 32 and end plates 36, 37 close the valve housing 30. For conducting pressure fluid to and from the valve housing 30, a manifold 38 is sceured to the outside of the housing 30 having a single inlet port 40 and a plurality of outlet ports 41A–F, all of these ports being alined, which communicate with passages 43, 44A–F in the housing leading to the interior of the valve and through the rotatable spools 34, 35.

The selector valve in a system like that illustrated in Fig. 18 provides a total of twenty-four spindle speeds plus a neutral. In this case the forward spool 34 allows selecting one of three speed ranges or a neutral position as indicated on the dial 28 mounted on the front of the valve, while the rear spool 35 allows selecting one of eight speeds within each speed range.

For turning the forward and rear spools 34, 35 an outer hand wheel 46 and an inner hand wheel 47 are provided which are mounted on the front of the valve housing 30 and outside of the headstock casting. For mounting purposes, the spools 34, 35 are supported within the valve housing 30 on a shaft 48 which is rotatably journalled in the end plates 36, 37. In the arrangement shown the rear spool 35 is keyed to this shaft 48 while the forward spool is rotatably mounted on it. Thus to operate the rear spool 35 the outer hand wheel 46 is pinned to the shaft 48. This outer hand wheel 48 is in two sections, an outer section 49 which has spokes 50 outlining openings through which the dial 28 is visible, and an inner section 51 which bears an indicator plate 52 having the spindle speed indicia.

The inner hand wheel 47, which is slightly larger in diameter than the outer wheel 46, is keyed directly to a hub 53 on the forward spool and thus is used to turn the forward spool 34 selectively to positions determining the speed ranges for the headstock transmission. An indicator plate 54 is fastened to the inner hand wheel 47 and gives spindle speed range indicia, this indicator plate 54 being located outwardly and concentric with the indicator plate 52 which is fastened to the outer wheel 46. In this manner, the speed range indicia appears towards the outer edge of the dial 28, while the speeds within the range, which are adjusted by the outer wheel 46 and determined by the rear spool 35 position are read inwardly towards the center of the dial. A transparent cover 56 lies over both indicator plates 52, 54, and turns with the inner hand wheel 47, being for this purpose fixed at its periphery to the inner hand wheel and having a sliding fit around the hub 57 of the outer hand wheel. A pointer 59 fastened on the headstock 24 is used for orienting the hand wheel positions in operating the valve.

Figure 7:
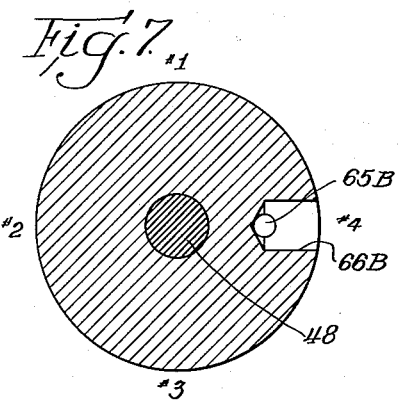
Figs. 7–9 are transverse sectional views taken through the forward spool substantially in the planes of lines 6—6, 7—7, 8—8 and 9—9, respectively, and show the locations of the longitudinal passages and of the radial passages.
Figure 8:
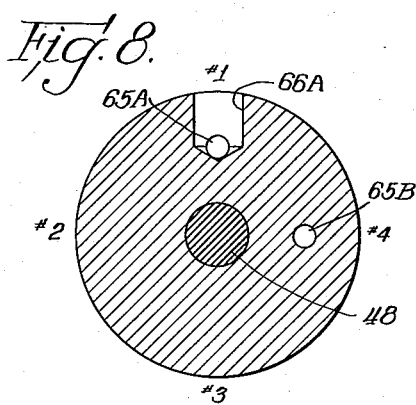
Figure 9:
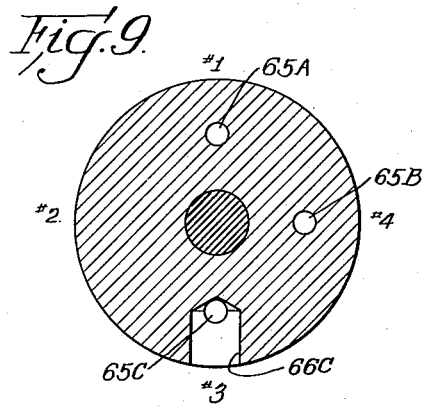

Referring particularly to Fig. 4, pressure fluid is led to the interior of the valve from the pressure line 25 through the inlet port 40 in the manifold 38, and a radial inlet passage 61 in the fixed center plate 33 which divides the bore of the valve housing 30 into forward and rear spool chambers 31, 32. Longitudinal drilled holes 62, 63 are located in the center plate 33 inwardly near the central axis of the valve housing and provide inlet holes for bringing pressure fluid to the spools. Pressure fluid is led from the inlet holes 62, 63, in the center plate to the outlet ports 41A–F of the manifold 38 via a selected one of a plurality of longitudinal passages 65A–K in each of the spools 34, 35 depending on the position of the spools, and radial passages 66A–K in the spools which communicate with the longitudinal spool passages 65A–K. The radial passages 44A–F in the valve housing 30 lead pressure fluid from the spools 34, 35 to the outlet ports 41A–F of the manifold 38. The longitudinal passages 65A–K in the spools 34, 35 extend from the spool face 67, 68 against the center plate 33 substantially the full length of the spool body. Referring to the developed views of the circumferences of the spools, Figs. 5 and 7, the sectional views of the spools, Figs. 7–12, and the hydraulic circuit of Fig. 18, it will be seen that in this manner pressure fluid is directed to selected ones of the outlet pressure lines 22A–F leading to the gear shifting cylinders 23A–D for control purposes.

In accordance with the present invention, leakage of high pressure fluid from the passages of the valve is prevented by means utilizing the pressure of the fluid passing through the valve to form a fluid seal. In carrying out the present invention, seal plungers 70A–K are mounted in the spools 34, 35, which when the valve is operated and pressure fluid is led into the valve, actuate to seal against leakage between the spools and the valve housing. In a preferred form of the invention, such seal plungers 70A–K are mounted in the radial passages 66A–K in the spools 34, 35 to seal against leakage into the space between the circumferences of the spools and the walls of the spool chambers 31, 32. Thus an accurate clearance fit between the spool and spool chamber wall is not required to prevent fluid leakage. Plungers for sealing purposes also are mounted in the inlet holes 62, 63 in the center plate 33, to seal against leakage between the center plate 33 and the faces 67, 68 of the spools 34, 35 respectively. Normal machining tolerances provide a running clearance between the faces of the center plate 33 and the ends of the spools 34, 35. These plungers in the center plate provide a fluid seal preventing leakage into the clearance spaces between the center plate and the spools.

Figure 15:
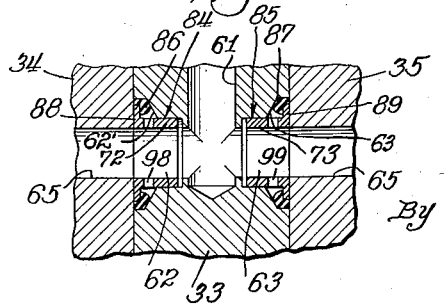
Fig. 15 is an enlarged fragmentary sectional view showing the sleeve plungers between the center plate and spools, and is taken substantially in the plane of lines 15—15 of Fig. 4.

Referring to Figs. 13–15 which show the plunger elements in detail, as well as to Fig. 4 which shows the assembled valve, it will be seen that the spools 34, 35 are mounted with substantial clearance between the circumferences of the spools and the walls of the spool chambers 31, 32 defined in the valve housing. The space 75 between the spool and spool chamber wall is maintained at low pressure through a drain fitting 76 connected to the return line to the pressure fluid source. The radial passages 66A–K provided in the spools 34, 35 of the valve are substantially larger in diameter than the longitudinal passages 65A–K in the spools.

In keeping with the present invention, to prevent leakage of pressure fluid, the seal plungers 70A–K are machined to have a sliding fit in the relatively large diameter radial passages 66A–K so that the force of high pressure fluid applied against the plungers forces them outwardly. For leading fluid through the plungers to the outlet ports 41A–F in the manifold 38, the plungers 70A–K are bored lengthwise, the size of the bore 77 being only slightly smaller than the size of the inlet passage 61 in the center plate. The plunger passage 77 is in direct communication with the radial outlet passage (44A–F) in the housing 30 which leads to the corresponding outlet port (44A–F) of the manifold. A circumferential O ring 78 is provided between the plunger and the wall of the radial passage in the spool for sealing purposes. This O ring is contained in a circumferential groove around the plunger.

As shown in Figs. 3, 4 and 13, for sealing purposes and to define a flat seat for the seal plungers 70A–K, a shallow groove 80 slightly wider than the plunger is machined in the inner wall of the housing 30 defining the spool chambers 31, 32. This groove runs lengthwise of the housing under the alined outlet ports in the housing and manifold and may be machined by an inexpensive broaching operation. An O ring 81 in a circular groove in the end of each plunger 70A–K provides a resilient seal which is compressed against the bottom of the groove in the wall of the spool chamber when the plunger is seated by pressure fluid. Thus the O ring 81 is effective to positively prevent leakage into the space 75 between the spool and the spool chamber wall. The end of the plunger at points on opposite sides contacts the beveled edges of the groove running lengthwise of the housing leaving a slight spacing between the flat end of the plunger and the flat surface of the groove. Since the plunger is cylindrical in shape while the groove is elongated, the plunger only seats at the two opposite points. The space surrounding the O ring is in communication with the clearance space around the spool.

Further in keeping with the invention, another leakage point in the valve is sealed by seal plungers like those mounted in the circumferences of the spools, this leakage point being present between the inner faces 67, 68 of the spools 34, 35 and the center plate 33. Referring to Figs. 4 and 15, it will be seen that where the inlet holes 62, 63 in the center plate communicate with the longitudinal passages 65 in the spools 34, 35 the drilled inlet holes 62, 63 are counterbored 62', 63', to receive flanged plunger sleeves 84, 85 which are inserted with a slip-fit into place. An O ring 86, 87 for each sleeve, positioned in the space between the counterbore wall and the outer edge of the flange 88, 89 on the sleeve, upon pressure being applied to it, is extruded partially through the space, placing sealing material in contact with the face 65, 68 of the adjacent spool.

The spools of the rotary selector valve 20 illustrated are to be shifted with the hydraulic pressure "off" and are not intended to be shifted when pressure is applied. Thus the friction involved in rotating the spools 34, 35 between positions is small, making the valve easily operated, and the rotary positions of the individual spools are defined by ball detents 91, 92. The spools contact the end plates 36, 37 only in the region of a raised ring 93 which is provided on the inner surface of the end plates. Drainage grooves 94 are provided in the end plates allowing fluid to move freely into the clearance space 95 at the ends of the spool chambers. For convenience the detent 92 for the rear spool 35 is mounted in the rear end plate 37 while the detent 91 for the forward spool 34 is located to operate on the hub 53 of the hand wheel 47 for this spool.

In the operation of the valve 20, with the forward and rear valve spools positioned as shown in Fig. 4, for example, pressure fluid is directed to the outlet ports 41B, 41E and 41F of the manifold 38 and the corresponding outlet pressure lines 22B, 22E and 22F, respectively, leading to the gear shifting cylinders 23A, 23D and 23C, respectively. To obtain a different speed, or neutral, the hydraulic pressure is turned "off," and by referring to the dial 28 the speed range (forward) spool 34 adjusted by the inner hand wheel 47, and the individual speed (rear) spool 35 adjusted by the outer hand wheel 46.

With the pressure fluid turned "on," upon fluid entering the valve 20 through the inlet port 40 of the manifold 38 and the inlet passage 61 in the center plate, the flanged sleeve 84, 85 in the counterbores for the drilled inlet holes 62, 63, in the center plate 33, and the resilient O rings 86, 87, contained thereby, are forced by the fluid flowing through the flanged sleeves against the faces 67, 68 of the spools. In the case of both plunger sleeves, radial openings 98, 99 are provided through the sleeve wall leading to the counterbore space behind the O ring, for applying pressure to the resilient ring for extruding it partially thorugh the annular space arond the flange, as shown in Fig. 15, and to fluid flowing through the plunger sleeves is utilized for moving the sleeves into contact with the spools, for sealing against leakage of fluid. The sealing rings 86, 87, therefore, seal against leakage between the outer edges of the flanges 88, 89 on the sleeves 72, 73 and the edge of the counterbores 62', 63' in which the sealing rings are received, and acting against the rear faces of the flanges press them into contact with the adjacent surfaces on the spools. The sleeves thus provide a fluid seal against leakage from the communicating passages in the center plate and vale spool into the clearance space between these valve elements.

Similarly, upon pressure fluid entering the alined longitudinal passages in the forward and rear spools 34, 35, and passing thence to the radial passages 66 in the spools, with the spools positioned as shown in Fig. 4, a total of three seal plungers 70A, 70K (Figs. 4–12) are actuated by the fluid for sealing purposes.

Figure 5:
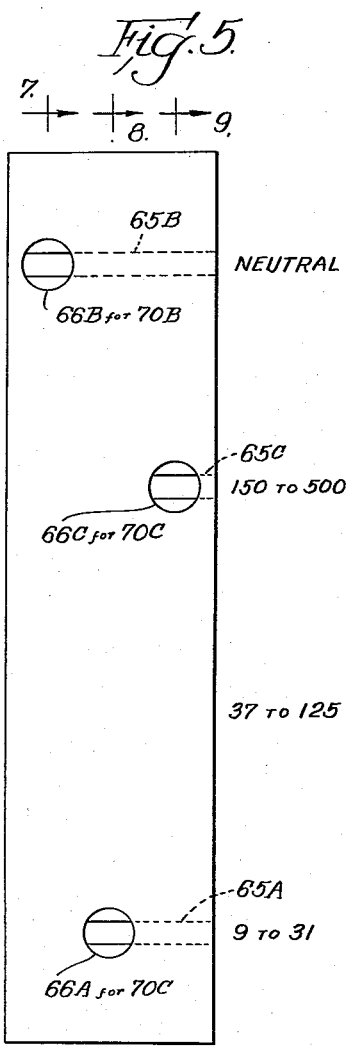

Referring more specifically to Fig. 4, the forward spool is shown in position No. 1, as designated in Fig. 5, which is the position of the forward spool 34 for the speed range between 9–31 r.p.m. The dial 28 indicates that the forward spool is positioned for this speed range as shown in Fig. 2. In the position shown for the forward valve spool, pressure fluid is led to the intermediate outlet port 41B in the manifold, and referring to Fig. 18, the outlet pressure line 22B connected to this intermediate port leads to the differential gear-shifting cylinder 23A.

Again referring to Fig. 4, the rear spool 35 is shown in position No. 7. This is the position of the rear spool (Fig. 6) for either of the speeds 26 r.p.m., 105 r.p.m., or 42 r.p.m., depending upon the speed range in which the forward spool 34 is positioned. The dial 28 again indicates these individual speeds as shown in Fig. 2. Of course, with the forward spool positioned for the lowest speed range, the lowest speed, namely 26 r.p.m., would be obtained from the transmission. With the rear spool so positioned, pressure fluid is led to the rearmost and intermediate outlet ports 41E, 41F in the manifold 38 by means of two radial passages 66K in the spool. Referring to Fig. 18, the outlet pressure lines 22E, 22F lead from these ports (41E, 41F) to the gear shifting cylinders 23D and 23C respectively.

An alternative form for the seal plungers mounted in the circumferences of the spools is shown in Figs. 16, 16a and 17. For preventing damage to the sealing O rings on the ends of the plungers, further in keeping with the invention, a second plunger is mounted on the end of the main plunger to hold the O ring. The main plunger element 101 is machined for a sliding fit in the radial spool passages, and has an O ring 102 around its periphery for sealing purposes. A passage 103 is drilled axially through the plunger for leading pressure fluid radially to the outlet passage in the housing. In the present instance, this passage 103 through the plunger 101 is counterbored to receive a flanged sleeve plunger 105 which is slidably mounted therein. To prevent leakage through the space between the outer edge of the flange 106 on the sleeve, and the counterbore wall 107, a resilient O ring 108 is located, this O ring 108 also acting upon the application of pressure from fluid passing through the valve, through radial openings 109 in the sleeve, against the sleeve to force the latter into contact with the wall of the spool chamber as shown in Fig. 16a. It will be observed that the pressure fluid acting against the sealing O ring presses the sleeve into contact with the wall of the spool chamber. A groove 80 (Fig. 4) is present in the spool chamber wall to provide a flat seat for the sleeve.

As mentioned hereinbefore, it is intended that the spools of the rotary selector valve which is illustrated, should be operated only with the hydraulic pressure "off." With the fluid pressure "on," the plungers 70A–K are maintained radially outwardly by a differential force due to the pressure of the fluid. When the valve 20 is open and pressure fluid is being supplied to selected outlet pressure lines, force due to fluid pressure being applied to a larger area at the bottom surface of the plungers than at the top surface of the plungers, acts to press the rings supported on the ends of the plungers into contact with the groove in the spool chamber wall. This results in a seal against leakage of fluid into the clearance space between the surface of the spool and the spool chamber wall. In the case of both forms of seal plunger elements, shown in Figs. 13 and 16, respectively, in the event the spools 34, 35 are rotated when the pressure is "on" and with the plunger elements positioned radially outwardly, the O rings on the plunger ends are caused to rub across the machined surface of the groove 80 in the spool chambers, which may result in damage to the O rings. Also with either form of plunger seal element, as shown in Fig. 13, the chamfered edges 111 of the groove in the housing inner wall cam the plungers inwardly to a position as shown in dotted lines in Fig. 13. As depicted in this figure, due to the curvature of the wall of the spool chamber and the manner in which the plungers are proportioned, after the plunger element has been cammed entirely out of the groove, the O ring is separated from rubbing contact with the wall and further damage to the O ring is prevented. In the case of the modification shown in Fig. 16, the flange 106 on the sleeve plunger 105 by overlying a major extent of the O ring 108 is intended to protect the O ring against any damage in the event of rotary movement of the spool while the valve is in operation.

The terms "O ring" and "sealing ring" as used herein designate resilient fluid sealing elements well known in the art, and equivalents.

We claim as our invention:

1. In a rotary selector valve, a valve housing defining a spool chamber, a rotatable valve spool mounted in said chamber with clearance between said spool and the wall of said chamber, said spool having passages and said spool chamber wall having ports adapted to register with selected of said passages at different positions of said spool, a seal plunger slidably received in each passage in the spool and arranged to move forward towards the spool chamber wall and a port therein, said plunger having a passage communicating with said port and the passage in the spool, means for sealing between the plunger and the wall of the passage in which it is received, resilient means for sealing between the forward end of the plunger and the spool chamber wall surrounding the port, means for delivering fluid under pressure to the passage in the spool, and means defining unequal oppositely facing effective areas on the plunger acted on by said pressure fluid so that said plunger is forced forward towards the spool chamber wall by a differential force compressing said means for sealing to provide a fluid seal preventing leakage of fluid into the clearance space, and means operative as an incident to rotating said spool for camming said plunger away from the spool chamber wall to separate said resilient means from contact therewith.

2. In a rotary selector valve, a valve housing defining a spool chamber, a rotatable valve spool mounted in said chamber to provide a clearance space between the adjacent surfaces of said spool and chamber, said spool and housing having passages ported to said surfaces, said ports being adapted to register when the valve is in open position, a sleeve received in a passage in the spool at the port and arranged to contact an area of the adjacent surface of the spool chamber wall surrounding a port therein, said sleeve having a through passage alined with said port when the valve is in open position and communicating with the passage in the spool, said area being formed as a flat surface to provide a seat for said sleeve said sleeve having an annular flange, an O ring surrounding said sleeve and being adapted to squeeze over said flange into contact with the flat surface area of the adjacent wall surrounding the port for providing a fluid seal preventing leakage of fluid into the clearance space, and means for delivering fluid under pressure through the passage in the spool to said sleve and O ring.

3. In a rotary selector valve, a valve housing defining a spool chamber, a rotatable valve spool mounted in said chamber to provide a clearance space between the adjacent surfaces of said spool and chamber, said spool and housing having passages ported to said surfaces, said ports being adapted to register when the valve is in open position, the combination comprising, a plunger slidably received in each passage in the spool and arranged to move forward towards the adjacent surface of the spool chamber wall and a port therein, said plunger having a through passage alined with said port when the valve is in open position, means for sealing between the plunger and the wall of the passage in which it is received, a sealing ring spacing the forward end of said plunger and the adjacent surface surrounding said port when said plunger is moved forward for providing a fluid seal preventing leakage of fluid into the clearance space, the surface surrounding the port being formed substantially flat to provide a seat for the sealing ring, and means for delivering fluid under pressure behind said plunger to move the plunger forward.

4. In a rotary selector valve, a valve housing defining a spool chamber, a rotatable valve spool mounted in said chamber with clearance between said spool and the wall of said chamber, said spool having a radial passage and said housing having a port adapted to register with said radial passage when the valve is in open position, a plunger slidably received in said radial passage in the spool and arranged to move outwardly towards the spool chamber wall, said plunger having a through passage alined with said port when the valve is in open position and communicating with the radial passage in the spool, means for sealing between the plunger and the wall of the radial passage in which it is received, a sleeve slidably received in the end of said plunger and arranged to contact an area of the adjacent wall of the spool chamber around the port therein, said area being formed as a flat surface to provide a seat for said sleeve, said sleeve having an annular flange, a sealing ring surrounding said sleeve and being adapted to squeeze over said flange into contact with the flat surface area of the adjacent wall surrounding the port for providing the fluid seal preventing leakage of fluid into the clearance space, and means for delivering fluid under pressure through the radial passage in the spool to said sleeve and sealing ring.

5. In a rotary selector valve, an elongated valve housing defining a spool chamber, a rotatable valve spool mounted in said chamber with clearance between said spool and the wall of said chamber, said spool having longitudinally spaced staggered radial passages and said spool chamber having longitudinally spaced alined ports adapted to register with selected of said radial passages, a plunger slidably received in each said radial passage in the spool and arranged to move outwardly towards the spool chamber wall, said plunger having a through passage communicating with the radial passage in the spool, means for sealing between the plunger and the wall of the radial passage in which it is received; and sealing means between said plunger and said chamber wall including a sleeve slidably received in the end of said plunger and arranged to move outwardly towards the wall of the spool chamber upon the application of fluid under pressure to said sleeve, said spool chamber wall having a groove in line with the alined ports forming a flat surface to provide a seat for said sleeve, said sleeve having an annular flange for contacting said flat surface, a sealing ring surrounding said sleeve and being adapted to squeeze over the flange into contact with the flat surface of the groove surrounding the port for providing a fluid seal preventing leakage of fluid into the clearance space, and means for delivering fluid under pressure through each said radial passage to the sleeve and sealing ring.

6. In a rotary selector valve, a valve housing defining a spool chamber, a rotatable valve spool mounted in said chamber with clearance between said spool and the wall of said chamber, said spool having longitudinally spaced staggered radial passages and said spool chamber having longitudinally spaced alined ports adapted to register with selected of said radial passages, a seal plunger slidably received in each said radial passage in the spool and arranged to move outwardly towards the spool chamber wall and a port therein, said plunger having a through passage communicating with the radial passage in the spool, means for sealing between the plunger and the wall of the radial passage in which it is received, an O ring mounted to project from the end of said plunger, said spool chamber wall having a groove in line with the alined ports and forming a flat surface around the ports to provide a seat for said O ring, and means for delivering fluid under pressure through the radial passages in the spool behind said plunger to force said plunger radially outwardly compressing said O ring and providing a fluid seal preventing leakage of fluid into the clearance space.

7. In a valve having relatively movable valve elements with clearance between adjacent surfaces of said elements, said elements having passages ported to said surfaces, said ports being adapted to register when the valve is in open position, the combination comprising, a plunger slidably received in a passage in one of said elements and arranged to move towards the other element and a port therein, said plunger having a passage alined with said port, means for sealing between the plunger and the wall of the passage in which it is received, an O ring between said plunger and the surface surrounding the port in the other element providing a fluid seal preventing leakage of fluid into the clearance space, the surface around the port being formed substantially flat to provide a seat for the O ring, and means for delivering fluid under pressure behind said plunger to move the plunger towards the other elements.

8. In a valve having relatively movable valve elements mounted with clearance between adjacent surfaces thereof, said elements having selectively registerable ports in said surfaces, the combination comprising, means received in one of said elements and movable toward the adjacent surface of the other element, said means including a resilient sealing ring adapted to be compressed against the surface of the said other element surrounding the port therein upon such movement of said means, means for delivering fluid under pressure to said ports, said first-named means being acted on by said pressure fluid so as to cause the sealing movement whereby said sealing ring is compressed providing a fluid seal preventing leakage of fluid into the clearance space, and means effective as an incident to relative movement between the valve elements for moving said first-named means away from the said adjacent surface of the other element so as to separate said sealing ring from contact therewith.

9. In a rotary selector valve, the combination comprising, a valve housing defining a spool chamber, a valve spool mounted in said spool chamber so as to be spaced from the wall thereof, means in said valve housing defining outlet ports in the wall of said spool chamber alined parallel to the axis of said spool, means in said valve housing adjacent one end of said valve spool defining an inlet passage for pressure fluid, said valve spool having longitudinal passages selectively registerable with said inlet passage at different rotary positions of said valve spool, said valve spool also having a radial passage communicating with each longitudinal passage and adapted to register with one of said outlet ports in said spool chamber wall to conduct pressure fluid through the valve, a sealing plunger slidably received in each of said radial passages in the spool and in said inlet passage, said plungers being arranged to move radially outwardly into contact with the adjacent spool chamber wall and longitudinally into contact with the adjacent end wall of the spool, respectively, means carried by each plunger forming a fluid seal with the surface of the adjacent wall upon such contact, said surfaces being formed substantially flat to provide a seat for said fluid sealing means, said plungers having a passage for conducting pressure fluid therethrough, and means responsive to pressure fluid flow through the valve for forcing each plunger into sealing contact with the adjacent wall to provide a fluid seal preventing leakage from said passages.

10. In a rotary selector valve, the combination comprising, a valve housing defining a spool chamber, a rotatable valve spool mounted in said spool chamber so as to be spaced from the wall thereof providing a clearance space, said spool having radial passages and said spool chamber wall having outlet ports adapted to register with said radial spool passages for conducting pressure fluid through the valve, the surface of the chamber wall around each outlet port being formed substantially flat, a plunger slidably received in each of said radial passages in the spool and arranged to move radially outwardly across the clearance space into contact with the spool chamber wall, means carried by each plunger forming a fluid seal against the flat surface on the chamber wall around a registering port upon such contact, said plunger having a passage for conducting pressure fluid from the respective radial passage to a registering port, and means responsive to pressure fluid flow through the valve for forcing each plunger outwardly into sealing contact with the chamber wall to provide a fluid seal preventing leakage into the clearance space from said radial passages.

11. In a rotary selector valve, the combination comprising, a valve housing defining a spool chamber, a rotatable valve spool mounted in said chamber spaced from the wall thereof providing a clearance space, said spool having radial passages and said spool chamber wall having outlet ports adapted to register with selected of said radial passages for conducting pressure fluid through the valve, a plunger slidably received in each of said radial passages in the spool and arranged to move radially outwardly across the clearance space into contact with the spool chamber wall, said plunger having a passage for conducting pressure fluid therethrough, means responsive to flow through the valve for forcing the plungers in said selected radial passages radially outwardly into sealing contact with the chamber wall, so that with said clearance space at a relatively low pressure a fluid seal is provided preventing leakage into the clearance space from the selected radial passages, and means operative when flow is interrupted through said selected radial passages as an incident to rotating said spool for camming each of said plungers in said selected radial passages away from the spool chamber wall to separate the same from mutual contact.

References Cited in the file of this patent

UNITED STATES PATENTS

| | | |
|---|---|---|
| 825,370 | Zurbuch | July 10, 1906 |
| 1,571,744 | Vorel | Feb. 2, 1926 |
| 1,593,987 | Porter | July 27, 1926 |
| 2,529,412 | Parker | Nov. 7, 1950 |
| 2,533,931 | Hartley | Dec. 12, 1950 |
| 2,558,260 | Maky | June 26, 1951 |
| 2,593,733 | Davies | Apr. 22, 1952 |
| 2,628,809 | Mineska | Feb. 17, 1953 |
| 2,712,458 | Lipson | July 5, 1955 |
| 2,725,122 | Thorne | Nov. 29, 1955 |
| 2,810,543 | Bryant | Oct. 22, 1957 |
| 2,832,561 | Holl | Apr. 29, 1958 |
| 2,839,074 | Kaiser | June 17, 1958 |
| 2,861,771 | Bryant | Nov. 25, 1958 |
| 2,925,095 | Bates | Feb. 16, 1960 |